(12) United States Patent
Maireanu et al.

(10) Patent No.: US 7,804,278 B2
(45) Date of Patent: Sep. 28, 2010

(54) TOPOLOGY AND METHOD FOR DYNAMIC CHARGING CURRENT ALLOCATION

(75) Inventors: Stefan Maireanu, Sunnyvale, CA (US); Chun Lu, San Jose, CA (US); Jianping Xu, Chengdu (CN); Xiaohua Lei, Chengdu (CN); Zhitong Lei, Chengdu (CN); Yongqiang Yu, Chengdu (CN)

(73) Assignee: O2Micro International Ltd., Georgetown, Grand Cayman (KY)

( * ) Notice: Subject to any disclaimer, the term of this patent is extended or adjusted under 35 U.S.C. 154(b) by 700 days.

(21) Appl. No.: 11/880,898

(22) Filed: Jul. 25, 2007

(65) Prior Publication Data

US 2008/0197812 A1     Aug. 21, 2008

Related U.S. Application Data

(60) Provisional application No. 60/901,739, filed on Feb. 16, 2007.

(51) Int. Cl.
*H02J 7/04*     (2006.01)
*H02J 7/00*     (2006.01)

(52) U.S. Cl. .............. 320/145; 320/133; 320/140; 320/141; 320/151; 320/160

(58) Field of Classification Search ............ 320/145
See application file for complete search history.

(56) References Cited

U.S. PATENT DOCUMENTS 5,617,008 A * 4/1997 Eastmond et al. ......... 320/133
6,339,314 B1 * 1/2002 Bruning .................... 320/128

* cited by examiner

*Primary Examiner*—Edward Tso
*Assistant Examiner*—Johali A Torres Ruiz

(57) ABSTRACT

In one embodiment, a battery management system includes a charger controller for controlling a charging current of a battery according to a status of a load which is powered by the battery, and a counter coupled to the charger controller for determining a charging time according to such status. Advantageously, a first charging current is selected when the load is off. A second charging current that is less than the first charging current is selected when the load is on. Furthermore, a frequency of the counter is set to a first frequency when the load is off. The frequency is set to a second frequency that is less than the first frequency when the load is on.

26 Claims, 4 Drawing Sheets

| q | TCH [h] | ICHG |
|---|---|---|
| 0 – 0.1 | 16.00 | 0.1C |
| 0.1 – 0.2 | 8.00 | 0.2C |
| 0.2 – 0.3 | 5.33 | 0.3C |
| 0.3 – 0.4 | 4.00 | 0.4C |
| 0.4 – 0.5 | 3.20 | 0.5C |
| 0.5 – 0.6 | 2.13 | 0.75C |
| 0.6 – 0.7 | 1.60 | C |
| 0.7 – 0.8 | 1.07 | 1.5C |
| 0.8 – 0.9 | 0.80 | 2C |
| 0.9 – 1 | 0.36 | 3C |

FIG. 2

TOPOLOGY AND METHOD FOR DYNAMIC CHARGING CURRENT ALLOCATION

RELATED APPLICATION

This application claims priority to U.S. Provisional Application No. 60/901,739, filed on Feb. 16, 2007, which is hereby incorporated by reference in its entirety.

TECHNICAL FIELD

The present invention relates to a charging topology and in particular to a charging topology with dynamic charging current allocation.

BACKGROUND ART

Conventional AC adapters have limited output current. As such, such conventional AC adapters may not be able to support fast battery charging when a system load powered by a battery is ON (in operation). For example, one of these conventional charging methods uses an AC adapter which can either power the system or charge the battery. As such, the battery cannot be charged when the system is ON. Another method is to use an AC adapter which has the capability to power the system and also charge the battery at a high charging current simultaneously. However, this kind of AC adapter is complex and expensive.

A third method is to use an AC adapter which charges the battery at a constant high charging current when the system is OFF, and charges the battery at a constant low charging current when the system is ON. However, when the charging current is changed from high to low, a false charge termination may occur since a negative slope of the battery voltage may exceed a predetermined threshold. For example, for metal-hydride and nickel-cadmium batteries, the charging process is terminated when a negative slope of the battery voltage exceeds a certain threshold. In addition, a charging time determined by such a method is not accurate due to a variation of the charging current.

SUMMARY OF THE INVENTION

In one embodiment, a battery management system includes a charger controller for controlling a charging current of a battery according to a status of a load which is powered by the battery, and a counter coupled to the charger controller for determining a charging time according to such status. Advantageously, a first charging current is selected when the load is off. A second charging current that is less than the first charging current is selected when the load is on. Furthermore, a frequency of the counter is set to a first frequency when the load is off. The frequency is set to a second frequency that is less than the first frequency when the load is on.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 2 shows a table illustrating a relationship between a charging current and a charging time, in accordance with one embodiment of the present invention.

DESCRIPTION OF EMBODIMENTS

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a power supply topology with dynamic charging current allocation. In one such embodiment, a charging current ICHG and a charging time TCH for a battery is dynamically adjusted according to a status of a system load. Advantageously, embodiments in accordance with the present invention ensure a "safe" charging time TCH for the battery (that is, the battery is protected against undesirable conditions, e.g., over-voltage over-current, under-current, under-voltage, and over-temperature conditions) and also avoid a false charging termination when the system load changes the status. The power supply topology in the present invention is applicable to, but is not limited to nickel-metal-hydride and nickel-cadmium batteries.

Figure 1:
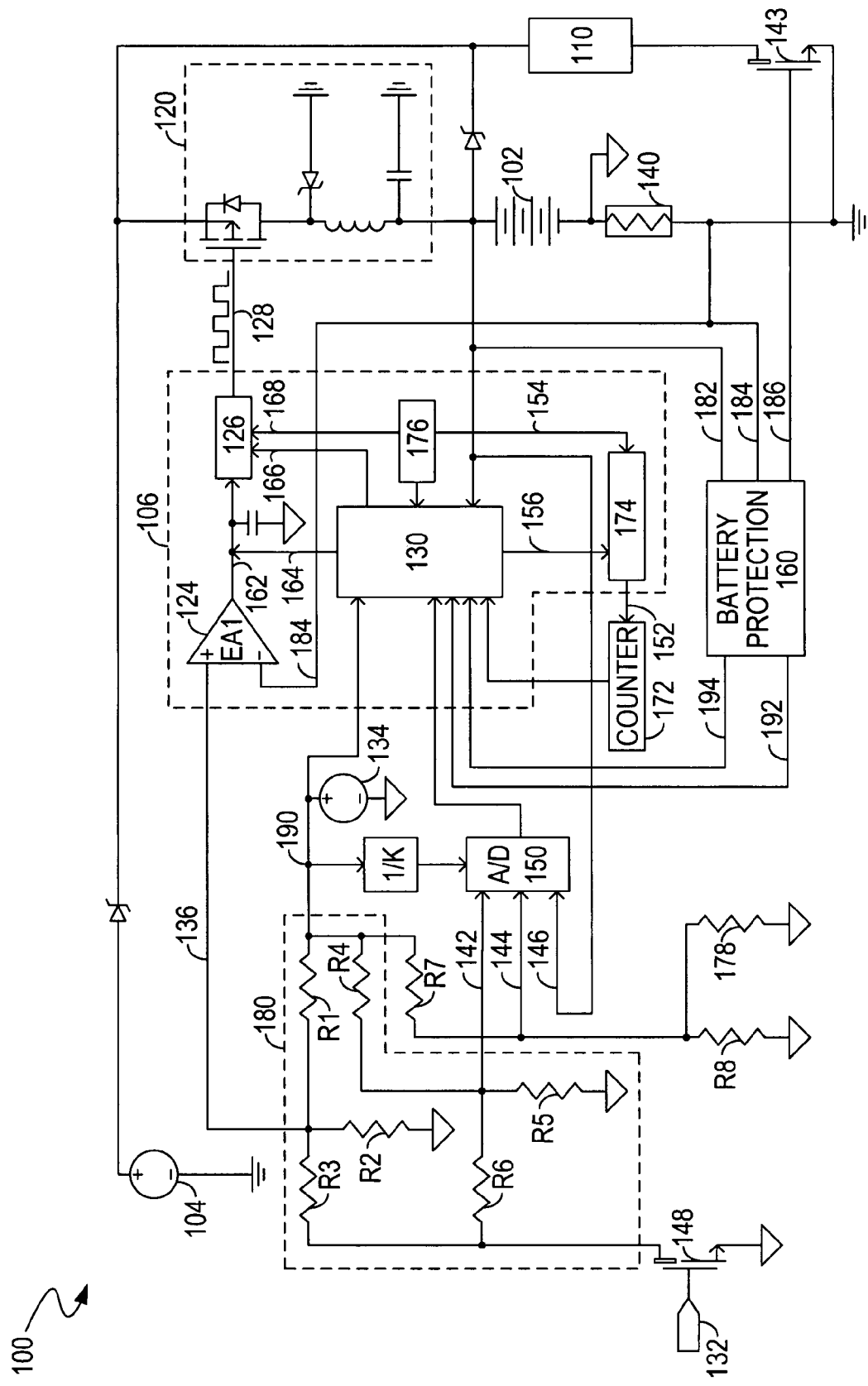
FIG. 1 shows a block diagram of a power supply topology with dynamic charging current allocation, in accordance with one embodiment of the present invention.

FIG. 1 shows a block diagram of a power supply topology 100 with dynamic charging current allocation, in accordance with one embodiment of the present invention. As shown in FIG. 1, either an adapter (e.g., an AC adapter) 104 or a battery 102 can power a system load 110. Furthermore, the AC adapter 104 can charge the battery 102 via a converter (e.g., a step-down DC/DC converter) 120, in one embodiment.

The power supply topology 100 includes a charger controller 106 for controlling a charging current ICHG of the battery 102 according to a status of the system load 110, and a counter 172 (e.g., an 8-bit digital counter) for determining a charging time TCH according to the status of the system load 110. For example, the charging time TCH expires when the counter 172 counts up to a maximum number N of the counter (e.g., for an 8-bit digital counter, its maximum number N is equal to $2^8 - 1$). In one embodiment of the present invention, the frequency of the counter 172 is dynamically controlled/adjusted, such that when the counter 172 counts up to its maximum number N, the battery 102 reaches its full capacity C.

Advantageously, a first charging current ICHG1 is selected when the system load 110 is off. A second charging current ICHG2 that is less than the first charging current ICHG1 is selected when the system load 110 is on. As such, the battery 102 is charged by a high charging current ICHG1 when the system load 110 is off and is charged by a low charging current ICHG2 when the system load 110 is on.

Furthermore, the counter 172 receives a frequency control signal 152 from the charger controller 106, which determines a frequency of the counter 172. Advantageously, the frequency of the counter 172 is set to a first frequency f1 when the system load 110 is off. The frequency of the counter 172 is set to a second frequency f2 that is less than the first frequency f1 when the system load 110 is on. As such, the charging time TCH determined by the counter 172 is adjusted adaptively according to the status of the system load 110.

As described above, the charging current ICHG and the charging time TCH are controlled/adjusted according to the status of the system load 110. As such, in one embodiment, an input is used to receive a sensing signal 132 indicative of the status of the system load 110. In one embodiment, the sensing signal 132 is high when the system load 110 is turned on, and the sensing signal 132 is low when the system load 110 is turned off. Consequently, a switch 148 controlled by the sensing signal 132 is switched on when the system load 110 is on, and the switch 148 is switched off when the system load 110 is off, in one embodiment.

A divider 180 is controlled by the sensing signal 132 via the switch 148. The divider 180 controlled by the sensing signal 132 is used to provide a charging time control signal 142 and a current reference signal 136 for the charger controller 106. The divider 180 can be implemented by numerous configurations. In one embodiment, the divider 180 includes resistors R1, R2, R3, R4, R5, and R6.

In one embodiment, the charging time control signal 142 and the current reference signal 136 are analog signals. The charger controller 106 receives the charging time control signal 142 in response to the sensing signal 132 for determining a charging time TCH of the battery 102, in one embodiment. The charger controller 106 also receives the current reference signal 136 in response to the sensing signal 132 for controlling a charging current ICHG of the battery 102, in one embodiment.

In one embodiment, an A/D converter 150 (e.g., a 10-bit analog to digital converter) converts analog signals 142, 144, and 146 into digital signals, and sends these digital signals to a digital control block 130 in the charger controller 106. As described above, the analog signal 142 is the charging time control signal which determines the charging time TCH of the battery 102. In addition, signal 144 received from a thermistor 178 is a temperature monitoring signal indicating a temperature of the battery 102. Signal 146 coupled to the battery 102 is a voltage monitoring signal indicating a battery voltage.

In one embodiment, input signals 142 and 144 of the A/D converter 150 are proportional to a reference signal $V_{190}$ (at node 190) of the A/D converter 150. The reference signal $V_{190}$ can be generated by a voltage source 134. As such, analog signals 142 and 144 can be converted into digital signals D142 and D144, which are no longer affected by a variation of the reference signal $V_{190}$. For example, if the signal D144 is a converted digital signal of the analog signal 144, the voltage of the signal D144 at N bit is given by $$V_{D144}[N] = \frac{2^N \cdot K_{144} \cdot V_{190}}{K \cdot V_{190}} - 1 = \frac{2^N \cdot K_{144}}{K} - 1,$$

where $$K_{144} = \frac{R_8 \cdot R_{178}}{R_7 R_8 + R_7 R_{178} + R_8 R_{178}}$$

and K is a predetermined constant value. As such, the voltage level of the converted digital signal D144 is only determined by $R_7$, $R_8$ and $R_{178}$. In one embodiment, the maximum value of $K_{144}$ is equal to K.

Functionalities of the charger controller 106 include, but are not limited to terminating charging, controlling a charging current ICHG, determining a charging time TCH, and protecting a battery 102 from over-current, over-voltage, under-current, under-voltage, and over-temperature conditions, in one embodiment.

As shown in FIG. 1, in one embodiment, an amplifier 124 is coupled to the battery 102 for comparing a signal 184, which indicates a charging current ICHG of the battery 102, with the current reference signal 136, and for generating an error signal 162. The charging current ICHG of the battery 102 can be sensed through a sense resistor 140. Furthermore, a pulse width modulation signal generator 126 is used to receive the error signal 162 and a ramp signal 168 from an oscillator 176, and generate a pulse width modulation signal 128 to control the charging current ICHG, in one embodiment. The level of the charging current ICHG is determined by a duty cycle of the pulse width modulation signal 128. In other words, the level of the charging current ICHG is determined by the level of the error signal 162 from the amplifier 124, in one embodiment.

Advantageously, the charger controller 106 controls a counter 172 to determine a charging time TCH based on the sensing signal 132 indicative of a status of the system load 110. More specifically, the charger controller 106 generates a frequency control signal 152 in response to the charging time control signal 142 for controlling a frequency of the counter 172. The frequency of the counter 172 is dynamically controlled such that when the counter 172 counts up to its maximum number, the battery 102 is charged to its full capacity. A digital control block 130 in the charger controller 106 receives the charging time control signal 142 via the A/D converter 150, and sends a control signal 156 to a programmable divider 174, in one embodiment. The programmable divider 174 generates a frequency control signal 152 for the counter 172 according to the control signal 156 and a frequency input signal 154 from an oscillator 176, in one embodiment. The programmable divider 174 can be implemented by numerous configurations.

Furthermore, the digital control block 130 in the charger controller 106 also receives a temperature monitoring signal 144 indicative of a temperature of the battery 102 and a voltage monitoring signal 146 indicative of a battery voltage via the A/D converter 150, in one embodiment. In one embodiment, the charging current ICHG decreases (e.g., to zero) when a positive slope of the temperature monitoring signal 144 exceeds a predetermined threshold ΔT. For example, the battery temperature can be tracked over time (e.g., cell temperature is compared from one cycle to the next) to determine if the battery temperature is falling, rising, or unchanged during a time interval. In one embodiment, the digital control block 130 can terminate battery charging (e.g., decrease the charging current to zero) by a control signal 164 or a control signal 166, when a positive slope of the temperature monitoring signal 144 greater than the predetermined threshold ΔT is detected.

In one embodiment, the charging current ICHG decreases (e.g., to zero) when a negative slope of the voltage monitoring signal 146 exceeds a predetermined threshold ΔV. For example, the battery voltage can be tracked over time (e.g., cell battery is compared from one cycle to the next) to determine if the battery voltage is falling, rising, or unchanged during a time interval. In one embodiment, the digital control block 130 can terminate battery charging (e.g., decrease the charging current to zero) by the control signal 164 or the control signal 166, when a negative slope of the voltage monitoring signal 146 greater than the predetermined threshold ΔV is detected.

In one embodiment of the present invention, the power supply topology 100 also includes a battery protection circuit 160 coupled to the battery 102 for protecting the battery 102 from undesirable conditions during discharging, e.g., under-voltage and under-current conditions. In one embodiment, the battery protection circuit 160 can be used to disconnect the battery 102 from the system load 110 when a voltage of the battery 102 is below a predetermined threshold $V_{th}$. For example, the battery protection circuit 160 receives a signal 182 indicative of the voltage of the battery 102 and sends a control signal 186 to switch off a switch 143, when the voltage of the battery 102 is below the predetermined threshold $V_{th}$. In one embodiment, the battery protection circuit 160 can be used to disconnect the battery 102 from the system load 110 when a current of the battery 102 is below a predetermined threshold $I_{th}$. For example, the battery protection circuit 160 receives a signal 184 (from a sense resistor 140) indicative of the current of the battery 102 and sends a control signal 186 to switch off the switch 143 when the current of the battery 102 is below the predetermined threshold $I_{th}$. Furthermore, the battery protection circuit 160 can also communicate with the charger controller 106 via communication signals 192 and 194, in one embodiment.

In operation, when the system load 110 is turned off, the sensing signal 132 will be low. As such, the switch 148 controlled by the sensing signal 132 is switched off. Therefore, the level of the current reference signal 136 is given by $$V_{136} = V_{190} \frac{R_2 R_{36}(R_4 R_{36} + R_4 R_5 + R_5 R_{36}) + R_1 R_2 R_5 R_{36}}{(R_1 R_{36} + R_1 R_2 + R_2 R_{36})(R_4 R_{36} + R_4 R_5 + R_5 R_{36}) - R_1 R_2 R_4 R_5},$$

where $R_{36}=R_3+R_6$. The error amplifier 124 compares a battery charging current ICHG from the sensing resistor 140 with the current reference signal 132, and generates an error signal 162 which controls a duty cycle of the pulse width modulation signal 128 in order to keep the charging current equal to ICHG1. As such, a first charging current ICHG1 is selected when the system load 110 is off.

Meanwhile, the level of the charging time control signal 142 is given by $$V_{142} = V_{190} \frac{R_5 R_{36}(R_1 R_{36} + R_1 R_2 + R_2 R_{36}) + R_2 R_4 R_5 R_{36}}{(R_1 R_{36} + R_1 R_2 + R_2 R_{36})(R_4 R_{36} + R_4 R_5 + R_5 R_{36}) - R_1 R_2 R_4 R_5} = V_{190} \cdot q_1,$$

where $$R_{36} = R_3 + R_6,$$

and $$q_1 = \frac{V_{142}}{V_{190}}.$$

The charger controller 106 receives the charging time control signal 142 and generates a frequency control signal 152 for the counter 172. The frequency control signal 152 sets a frequency of the counter 172 equal to f1. As such, a first frequency f1 is selected when the system load 110 is off.

When the system load 110 is turned on, the sensing signal 132 will be high. As such, the switch 148 controlled by the sensing signal 132 is switched on. Therefore, the level of the current reference signal 136 is given by $$V'_{136} = V_{190} \frac{R_2 R_3}{R_1 R_2 + R_1 R_3 + R_2 R_3}.$$

Similarly, the error amplifier 124 compares the battery charging current ICHG from the sensing resistor 140, with the current reference signal 132, and generates an error signal 162 which controls a duty cycle of the pulse width modulation signal 128 in order to keep the charging current equal to ICHG2 (ICHG2<ICHG1). As such, a second charging current ICHG2 that is less than the first charging current ICHG1 is selected when the system load 110 is on.

Meanwhile, the charging time control signal 142 is given by $$V'_{142} = \frac{V_{190} \cdot R_5 \cdot R_6}{R_4 R_5 + R_4 R_6 + R_5 R_6} = V_{190} \cdot q_2,$$

where $$R_{36} = R_3 + R_6,$$

and $$q_2 = \frac{V'_{142}}{V_{190}}.$$

In one embodiment, $V_{142}'$ is less than $V_{142}$ and $q_2$ is less than $q_1$. The charger controller 106 receives the charging time control signal 142 and generates a frequency control signal 152 for the counter 172. The frequency control signal 152 sets the frequency of the counter 172 equal to f2. As such, a second frequency f2 that is less than the first frequency f1 is selected when the system load 110 is on.

Advantageously, as described above, the charging time control signal 142 and the current reference signal 136 both change in relation to the status of the system load 110, in one embodiment. Furthermore, the battery charging time ICH will decrease as the current reference signal 136 increases, and vice versa.

FIG. 2 shows an example of a table illustrating a relationship between a charging current ICHG and a battery charging time TCH, in accordance with one embodiment of the present invention. FIG. 2 is described in combination with FIG. 1.

In one embodiment, the charging current ICHG is given by ICHG=C/(TCH*r), where C represents a battery capacity and r represents a chemistry efficiency of the battery (0<r<1). In the example of FIG. 2, the chemistry efficiency r of the battery is equal to 0.625, in one embodiment.

As shown in FIG. 2, the greater the charging current ICHG, the less the charging time TCH will be. In addition, the charging current ICHG decreases when a ratio q (which is equal to a signal level of the charging time control signal 142 divided by a signal level of the reference signal 190) decreases. As described in relation to FIG. 1, the ratio q2

$$\left(q_2 = \frac{V'_{142}}{V_{190}},\right.$$

when the system load 110 is on) is less than the ratio q1

$$q_1 = \frac{V_{142}}{V_{190}},$$

when the system load 110 is off). Therefore, the second charging current ICHG2 (when the system load 110 is on) is less than the first charging current ICHG1 (when the system load 110 is off).

Figure 3:
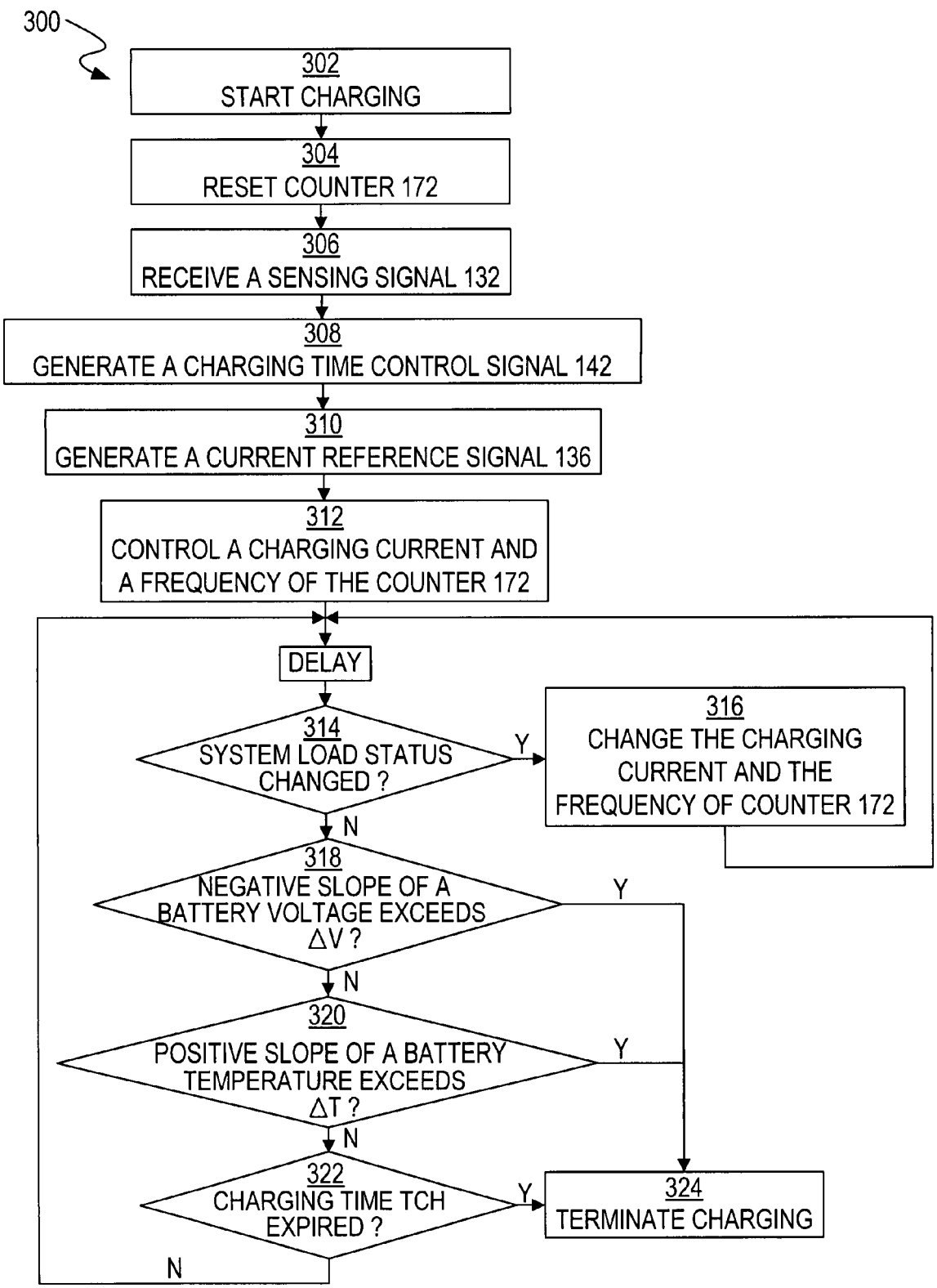
FIG. 3 shows a flowchart of a method of implementing a power supply topology with dynamic charging current allocation, in accordance with one embodiment of the present invention.

FIG. 3 shows a flowchart 300 of a method of implementing a power supply topology with dynamic charging current allocation, in accordance with one embodiment of the present invention. FIG. 3 is described in combination with FIG. 1.

In block 302, the power supply topology starts to charge a battery 102. A counter 172 is reset as shown in block 304. In block 306, a sensing signal 132 indicative of a status of a system load 110 is received. In block 308, a charging time control signal 142 is generated in response to the sensing signal 132 for determining a charging time TCH of the battery 102. Furthermore, a frequency control signal 152 is generated in response to the charging time control signal 132 for controlling a frequency of the counter 172 (not shown).

In block 310, a current reference signal 136 is generated in response to the sensing signal 132 for controlling a charging current ICHG of the battery 102. Furthermore, an error signal 162 is generated by comparing a battery charging current ICHG with the current reference signal 136 (not shown). A pulse width modulation signal 128 is generated according to the error signal 162 and a ramp signal 168 in order to adjust the charging current ICHG (not shown).

In block 312, the charging current ICHG and the frequency of the counter 172 are controlled according to the status of the system load 110. More specifically, the charging current ICHG and the frequency of the counter 172 are controlled by the current reference signal 136 and the charging time control signal 142, respectively.

In block 314, after a certain delay, the status of the system load 110 is monitored to determine if the status is changed. If the status is changed, the sensing signal 132 monitoring the system status will be changed accordingly. As such, the charging current ICHG and the frequency of the counter 172 will be changed accordingly as shown in block 316. The flowchart returns to the block 314 after a certain delay.

However, if the status of the system load 110 is not changed, then the flowchart goes to block 318. In block 318, a negative slope of the battery voltage is compared to a threshold ΔV. If the negative slope of the battery voltage exceeds the threshold ΔV, charging will be terminated as shown in block 324.

If the negative slope of the battery voltage does not exceed the threshold ΔV, the flowchart goes to block 320. In block 320, a positive slope of the battery temperature is compared to a threshold ΔT. If the positive slope of the battery temperature exceeds the threshold ΔT, charging will be terminated as shown in block 324.

If the positive slope of the battery temperature does not exceed the threshold ΔT, the flowchart goes to block 322. In block 322, the charging time TCH determined by the counter 172 is monitored. If the charging time TCH is expired (that is, the counter counts up to its maximum number N), charging will be terminated as shown in block 324. Otherwise, the flowchart will return to block 314 after a certain delay.

Figure 4:
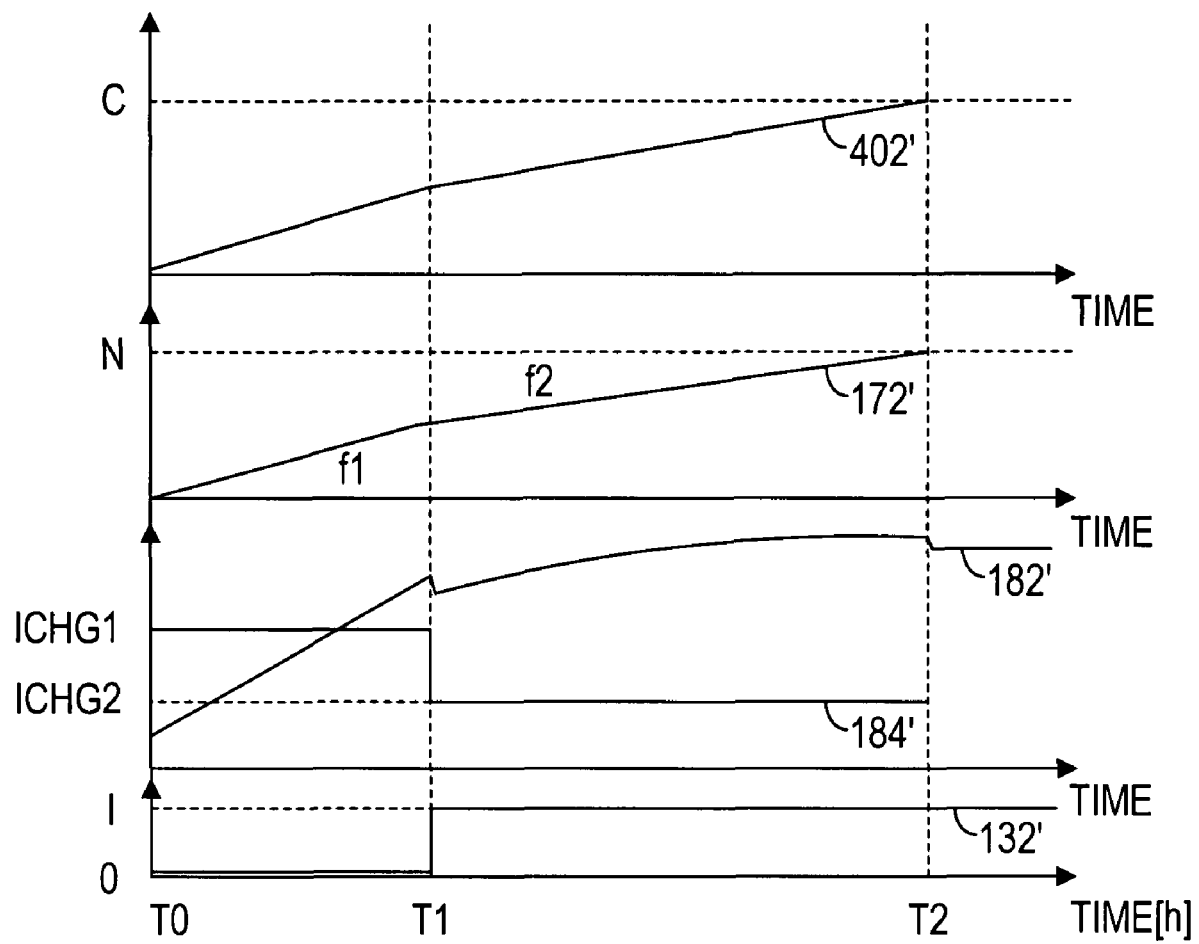
FIG. 4 shows an example of a waveform diagram of a power supply topology, in accordance with one embodiment of the present invention.

FIG. 4 shows a waveform diagram of a power supply topology, in accordance with one embodiment of the present invention. FIG. 4 is described in combination with FIG. 1. For simplicity, the chemistry efficiency of the battery 102 is set to 1 in the example of FIG. 4. Waveform 132' represents a signal level of the sensing signal 132. Waveform 184' represents a charging current ICHG of the battery 102. Waveform 182' represents a battery voltage. Waveform 172' represents a number counted by the counter 172. Waveform 402' represents a capacity of the battery 102.

In the example of FIG. 4, the capacity of the battery 102 is zero at time T0 (that is, the battery 102 is empty at time T0). From time T0 to T1, the system load 110 is off and the sensing signal 132 (shown as the waveform 132') is low. As such, the battery 102 is charged with a charging current ICHG1 (shown as waveform 184'). The battery voltage (shown as waveform 182') rises linearly. The counter 172 counts at a frequency f1 (shown as waveform 152').

At time T1 (e.g., 0.5 h), the system load 110 is turned on. Advantageously, as described in relation to FIG. 1, the current reference signal 136 and the charging time control signal 142 are changed based on the system status. As such, the battery 102 is charged with a charging current ICHG2 that is less than ICHG1 from time T1. For example, the level of the charging current ICHG2 is 50% of the level of the charging current ICHG1, in one embodiment. In addition, the counter 172 operates at a frequency f2 that is less than f1. Although there is a negative slope of the battery voltage at time T1, battery charging will not be terminated since the negative slope of the battery voltage is caused by the change of the system status and will be neglected.

From time T1 to T2 (e.g., 1.5 h), the counter 172 counts up to its maximum number N, such that the charging time TCH is ended. In addition, the negative slope of the battery voltage exceeds a predetermined threshold ΔV at time T2. Therefore, the charging process is terminated at time T2 and the battery 102 is charged to its full capacity C at time T2.

Advantageously, the counter 172 controlled by the charger controller 106 in FIG. 1 will dynamically update the charging time TCH based on the previous charging current ICHG1 and the actual current charging current ICHG2. As discussed above, the counter 172 is operated at different frequencies based on the system status. Furthermore, the frequency of the counter 172 is low when the charging current is low, and the frequency of the counter 172 is high when the charging current is high. For example, in FIG. 4, at time T1, when the charging current is changed from ICHG1 to ICHG2, the frequency of the counter 172 is changed from f1 to f2. As such, the battery 102 integrates variable current from time T0 to T2 shown as:

$$C = \sum_{T0}^{T1} ICHG1 \cdot dt + \sum_{T1}^{T2} ICHG2 \cdot dt. \tag{1}$$

The counter 172 integrates variable frequency from time T0 to T2 shown as:

$$\left( N = \sum_{T0}^{T1} f1 \cdot dt + \sum_{T1}^{T2} f2 \cdot dt \right). \tag{2}$$

As described above, C is the full capacity of the battery 102 and N is the maximum number of the counter 172. Advantageously, when the counter 172 counts up to N, the battery 102 also reaches its full capacity C as indicated in equations (1) and (2).

Accordingly, in one embodiment, the present invention provides a power supply topology with dynamic charging current allocation. In such an embodiment, a charging current and a charging time for the battery are dynamically controlled based on a status of a system load. Advantageously, embodiments in accordance with the present invention also ensure a safe charging time for the battery and avoid false charging termination when the system load changes the status.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery management system comprising:
a charger controller operable for controlling a charging current of a battery according to a status of a load which is powered by said battery, wherein a first charging current is selected when said load is off, and wherein a second charging current that is less than said first charging current is selected when said load is on; and
a counter coupled to said charger controller operable for determining a charging time according to said status, wherein a frequency of said counter is set to a first frequency when said load is off, and wherein said frequency is set to a second frequency that is less than said first frequency when said load is on.

2. The battery management system as claimed in claim 1, further comprising an input coupled to said charger controller for receiving a sensing signal indicative of said status.

3. The battery management system as claimed in claim 1, wherein said charger controller receives a charging time control signal in response to said status for determining said charging time.

4. The battery management system as claimed in claim 3, wherein said charger controller generates a frequency control signal in response to said charging time control signal for controlling said frequency.

5. The battery management system as claimed in claim 3, further comprising a divider coupled to said charger controller and operable for providing said charging time control signal.

6. The battery management system as claimed in claim 1, wherein said charger controller receives a current reference signal in response to said status for controlling said charging current.

7. The battery management system as claimed in claim 6, further comprising a divider coupled to said charger controller and operable for providing said current reference signal.

8. The battery management system as claimed in claim 6, further comprising an amplifier coupled to said battery operable for comparing said charging current with said current reference signal, and for generating an error signal.

9. The battery management system as claimed in claim 8, further comprising a pulse width modulation signal generator operable for receiving said error signal and a ramp signal, and for generating a pulse width modulation signal to control said charging current.

10. The battery management system as claimed in claim 1, wherein said charger controller receives a temperature monitoring signal indicative of a temperature of said battery.

11. The battery management system as claimed in claim 10, wherein said charging current decreases when a positive slope of said temperature monitoring signal exceeds a predetermined threshold.

12. The battery management system as claimed in claim 1, wherein said charger controller receives a voltage monitoring signal indicative of a voltage of said battery.

13. The battery management system as claimed in claim 12, wherein said charging current decreases when a negative slope of said voltage monitoring signal exceeds a predetermined threshold.

14. The battery management system as claimed in claim 1, further comprising a protection circuit coupled to said battery operable for disconnecting said battery from said load when a voltage of said battery is below a predetermined threshold.

15. The battery management system as claimed in claim 1, further comprising a protection circuit coupled to said battery operable for disconnecting said battery from said load when a current of said battery is below a predetermined threshold.

16. A method for charging a battery, comprising:
controlling a charging current of said battery according to a status of a load that is powered by said battery;
controlling a frequency of a counter that determines a charging time according to said status,
wherein a first charging current and a first frequency are selected when said load is off, wherein a second charging current that is less than said first charging current and a second frequency that is less than said first frequency are selected when said load is on.

17. The method as claimed in claim 16, further comprising: receiving a sensing signal indicative of said status.

18. The method as claimed in claim 17, further comprising: generating a charging time control signal in response to said sensing signal for determining said charging time.

19. The method as claimed in claim 18, further comprising: generating a frequency control signal in response to said charging time control signal for controlling said frequency.

20. The method as claimed in claim 17, further comprising: generating a current reference signal in response to said sensing signal for controlling said charging current.

21. The method as claimed in claim 20, further comprising: generating an error signal by comparing said charging current with said current reference signal.

22. The method as claimed in claim 21, further comprising: generating a pulse width modulation signal for controlling said charging current, wherein said pulse width modulation signal is generated according to said error signal and a ramp signal.

23. An electronic device comprising:
a load;
a battery for powering said load;
an adapter for charging said battery;
a charger controller operable for controlling a charging current of said battery according to a status of said load, wherein a first charging current is selected when said load is off, and wherein a second charging current that is less than said first charging current is selected when said load is on; and
a counter coupled to said charger controller operable for determining a charging time according to said status, wherein a frequency of said counter is set to a first frequency when said load is off, and wherein said frequency is set to a second frequency that is less than said first frequency when said load is on.

24. The electronic device as claimed in claim 23, further comprising an input for receiving a sensing signal indicative of said status.

25. The electronic device as claimed in claim 24, wherein said charger controller receives a charging time control signal in response to said sensing signal for determining said charging time.

26. The electronic device as claimed in claim 24, wherein said charger controller receives a current reference signal in response to said sensing signal for controlling said charging current.

* * * * *